US006967832B2

(12) United States Patent
Mariano

(10) Patent No.: US 6,967,832 B2
(45) Date of Patent: Nov. 22, 2005

(54) DRIVE BAY COVER AND EJECT BRACKET

(75) Inventor: Ricardo Alba Mariano, Hayward, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 10/993,180

(22) Filed: Nov. 19, 2004

(65) Prior Publication Data

US 2005/0067923 A1 Mar. 31, 2005

Related U.S. Application Data

(62) Division of application No. 10/029,475, filed on Nov. 1, 2001, now Pat. No. 6,834,919.

(51) Int. Cl.[7] .................................................. G06F 1/16
(52) U.S. Cl. ...................... 361/683; 361/685; 361/727; 312/223.2; 369/75.1
(58) Field of Search ................................ 361/683, 684, 361/685, 724–727, 731–734; 312/223.11, 312/223.2, 324, 326, 327, 328, 291–292, 312/319.1, 319.2; 220/341, 334, 337, 342; 360/137; 369/75.1–75.2, 77.1–77.2, 191, 369/278; 292/80, 87, 203, 204, 209

(56) References Cited

U.S. PATENT DOCUMENTS

| 5,351,228 | A | * | 9/1994 | Kanno et al. ................ 720/647 |
| 5,815,379 | A | * | 9/1998 | Mundt ......................... 361/683 |
| 5,912,870 | A | * | 6/1999 | Kanno et al. ................ 720/643 |
| 5,924,782 | A | * | 7/1999 | Park ............................ 312/328 |
| 6,130,822 | A | * | 10/2000 | Della Fiora et al. ......... 361/724 |
| 6,132,019 | A | * | 10/2000 | Kim et al. ................ 312/223.2 |
| 6,588,624 | B1 | * | 7/2003 | Connors et al. ............. 220/827 |
| 6,590,765 | B2 | * | 7/2003 | Crowley ...................... 361/683 |
| 6,603,655 | B2 | * | 8/2003 | Hrehor et al. ............... 361/683 |
| 6,816,448 | B2 | * | 11/2004 | Lee ........................... 369/75.11 |
| 2002/0027771 | A1 | * | 3/2002 | Dong .......................... 361/685 |

* cited by examiner

Primary Examiner—Michael Datskovskiy
(74) Attorney, Agent, or Firm—Henneman & Saunders; Larry E. Henneman, Jr.

(57) ABSTRACT

A novel door for an access opening in an electronic component housing includes a bracket pivotally connected to the housing, and a cover elastically mounted to the bracket. In a particular embodiment, the bracket includes a wing spring for biasing the cover to the bracket, and the cover includes a channel for receiving the wing spring. Optionally, the cover and the bracket include an alignment feature and a complementary alignment feature, respectively, that moveably engage one another to facilitate relative movement between the cover and the bracket. The door is pivotally connected to the housing by a pair of L-shaped hinge members to rotate about an axis adjacent the opening in the housing. The bracket and the cover mount together to form the door assembly, and the assembly includes a smooth rear surface for slidably abutting devices (e.g., optical disk trays, etc.) moving through the opening. The door assembly is substantially free of any members projecting rearward of the smooth rear surface, so the opening in the housing is essentially clear of any components (e.g., retracting mechanisms, retaining structures, etc.) that might interfere with the travel of a device through the opening. The cover includes a beveled edge that mates with a beveled seat in the housing surrounding the opening in the housing. The alignment feature and the complementary alignment feature of the cover and the bracket loosely engage one another to allow the beveled edge of the cover to self-align within the beveled seat of the opening in the housing.

36 Claims, 5 Drawing Sheets

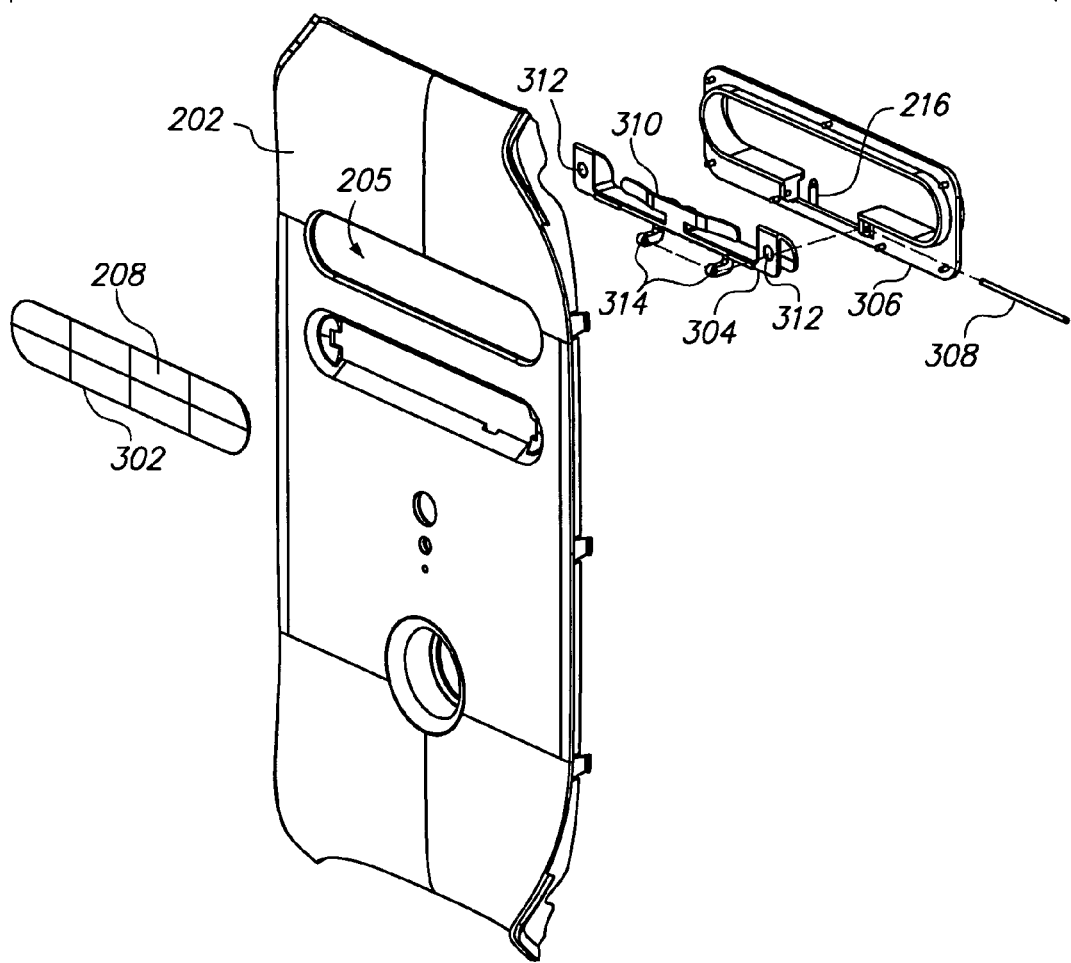

FIG. 5A
FIG. 5B
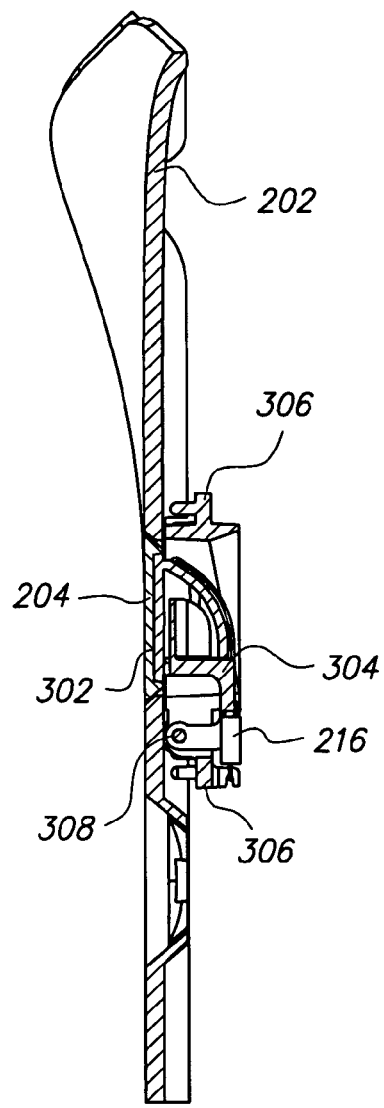
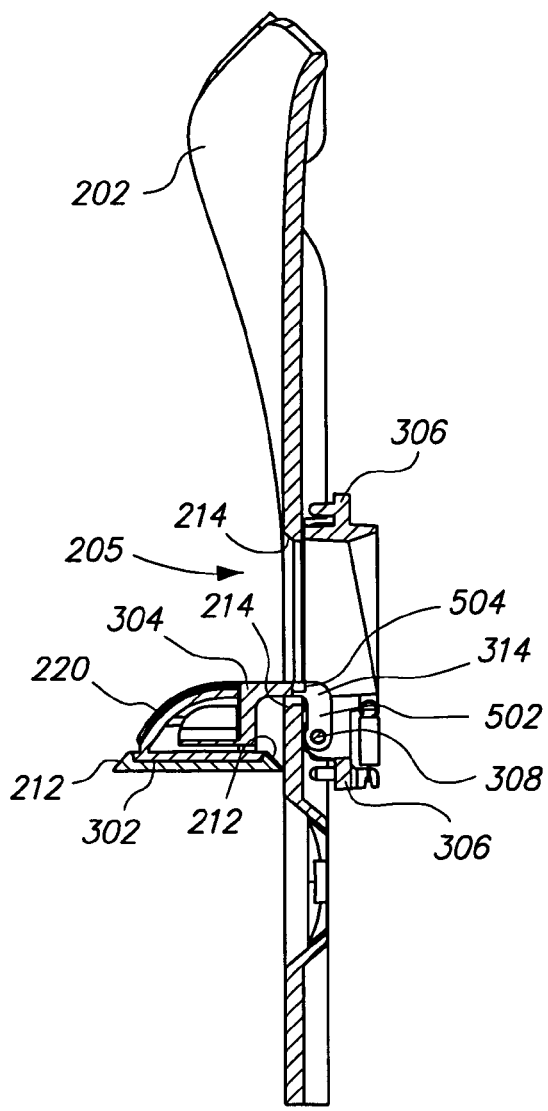

DRIVE BAY COVER AND EJECT BRACKET

RELATED APPLICATIONS

This application is a divisional of co-pending U.S. patent application Ser. No. 10/029,475, filed Nov. 1, 2001 now U.S. Pat. No. 6,834,919 by the same inventor, which is incorporated herein by reference in its entirety.

BACKGROUND OF THE INVENTION

1. Field of the Invention

This invention relates generally to access doors in electronic components, and more particularly to covers for openings in computer housings through which removable media type devices are accessed. Even more particularly, the present invention relates to a cover for an access opening to an optical disk drive unit in a computer.

2. Description of the Background Art

Electronic components (e.g., computers, audio compact disk players, etc.) now typically include covers for access openings in the components. For example, computer housings typically include doors to cover openings through which trays of optical disk drives slide in and out.

For both functional and aesthetic reasons, such doors should fit into the associated openings as closely as possible. A close fit between the opening and the cover reduces the amount of dust and dirt that can enter the drive component when the cover is closed, and also provides a more pleasing appearance. Additionally, minimizing the amount that a cover protrudes from the front of a housing minimizes the risk of accidental damage (e.g., snagging the cover on clothing) to the cover.

FIGS. 1(A–D) illustrate a few of the problems encountered in trying to minimize the clearance gap between a cover and an associated opening in a housing. FIG. 1A is a cross-sectional view of a typical prior art rectangular door 102 disposed in an opening 104 of a housing 106. Door 102 is mounted on a hinge pin 108 that traverses opening 104 near the bottom of opening 104. A gap 110 between door 102 and housing 106 provides clearance for door 102 to swing between open and closed positions.

As shown in FIG. 1B, clearance gap 110 must be large enough to allow door 102 to pivot about hinge pin 108. As long as door 102 pivots about an axis passing through opening 104, opening 104 must be at least as wide as the diagonal dimension (D) of door 102. Thus, the limiting minimum value of gap 110 is equal to one-half of the difference between the diagonal of door 102 and the width of door 102, assuming the top and bottom gaps are equal. Further, the distance from the center of hinge pin 108 to the edge of opening 104 must be slightly larger than the distance from the center of hinge pin 108 to the bottom front corner of door 102, otherwise the corner of door 102 will jam.

FIG. 1C shows an example of an over-size cover 112 that completely covers opening 104. Although cover 112 completely hides opening 104, it is unnecessarily large, and requires a hinge pin 114 mounted forward of the front plane of housing 106. Further, at least a portion 116 of cover 112 must be disposed forward of the front plane of housing 106, thus increasing the chance of accidental damage to cover 112.

FIG. 1D is a cross-sectional view of yet another door mechanism including a beveled cover 118 disposed in a beveled opening 120 in a housing 122. This design also requires that the hinge 124 be mounted forward of the front plane of housing 122. Otherwise, if door 118 is hinged at a location 126 within opening 120, beveled edge 128 of door 118 will jam against the beveled edge of opening 120. Further, it is difficult to mount and/or conceal a hinge at the thin beveled edge of cover 118.

Providing a close fit between a cover and an opening also creates significant alignment problems. For example, if a rectangular cover becomes slightly misaligned, it may jam in the opening, or fail to close. Similarly, if a beveled cover becomes misaligned, it will not seat properly in the beveled opening.

In addition to minimizing the gap between a cover and an opening, and minimizing the forward protrusion of the cover, it is also desirable for covers to operate with any device that may travel through the opening. Known covers typically include rearwardly projecting structures that serve retaining and/or retraction functions. Such structures operate through the opening, and may, therefore, interfere with the operation of some devices.

What is needed is a cover for an opening in a housing with a minimal clearance gap between the cover and the opening. What is also needed is a cover that minimizes any forward protrusion of the cover with respect to the front plane of the housing. What is also need is a cover whose hinge and/or retraction mechanism is hidden from view when the cover is in the closed position. What is also needed is a cover that is easy to align and maintain alignment with the opening in the housing.

SUMMARY

The present invention overcomes the problems associated with the prior art by providing a door for access openings in electronic component housings. The invention facilitates a very close fit between the door and the housing, and optionally provides a self-alignment feature.

The door includes a bracket pivotally connected to the housing, and a cover elastically mounted to the bracket. In a particular embodiment, a biasing member is disposed to urge the cover against the bracket. In a more particular embodiment, the biasing member is a flat spring, and the cover includes a channel for receiving the flat spring. In an even more particular embodiment, the biasing member is a wing spring that includes a central support structure extending upwardly from the bracket, and a pair of flat, slightly curved wing springs extending laterally from the support structure. Other means for elastically mounting the cover to the bracket may be substituted for the wing spring/channel assembly disclosed, including but not limited to coil springs, elastic bands, flexible adhesive compounds, forming the bracket and the cover from a single piece of flexible material, an so on.

Optionally, the cover and the bracket include an alignment feature and a complementary alignment feature, respectively. In the disclosed embodiment, the alignment feature includes a pair of posts mounted on the back of the cover, and the complementary alignment feature includes a pair of apertures in the bracket for receiving the posts. The alignment feature moveably engages the complementary alignment feature to facilitate relative movement between the cover and the bracket.

The door is pivotally connected to the housing to rotate about an axis adjacent the opening in the housing. The bracket includes at least one (two are disclosed) hinge member that extends downward and forward to the pivotal connection point. In the particular embodiment shown, the hinge members are L-shaped.

In the particular disclosed embodiment, the bracket and the cover mount together to form the door assembly, and the assembly includes a smooth rear surface for slidably abutting devices (e.g., optical disk trays, etc.) moving through the opening. One portion of the rear surface is flat, and another portion of the rear surface is arcuate. The door assembly is substantially free of any members projecting rearward of the smooth rear surface. Thus, the opening in the housing is essentially clear of any components (e.g., retracting mechanisms, retaining structures, etc.) that might interfere with the travel of a device through the opening.

The cover includes a beveled edge that mates with a beveled seat in the housing surrounding the opening in the housing. The alignment feature and the complementary alignment feature of the cover and the bracket loosely engage one another to allow the beveled edge of the cover to self align within the beveled seat of the opening in the housing.

BRIEF DESCRIPTION OF THE DRAWINGS

The present invention is described with reference to the following drawings, wherein like reference numbers denote substantially similar elements:

FIG. 3 is a an exploded perspective view of the access door of FIG. 2A;

FIG. 5A is a cross-sectional view, taken along Line A—A, of the access door of FIG. 2A; and FIG. 5B is a cross-sectional view, taken along Line B—B, of the access door of FIG. 2B.

DETAILED DESCRIPTION

The present invention overcomes the problems associated with the prior art, by providing an access door for a electronic component housing that facilitates translational as well as rotational motion of the door as it is opened and closed. In the following description, numerous specific details are set forth (e.g., biasing member type, alignment features, materials, etc.) in order to provide a thorough understanding of the invention. Those skilled in the art will recognize, however, that the invention may be practiced apart from these specific details. In other instances, details of well known design and manufacturing practices (e.g., plastic molding, material selection, assembly, etc.) and components have been omitted, so as not to unnecessarily obscure the present invention.

Figure 2A:
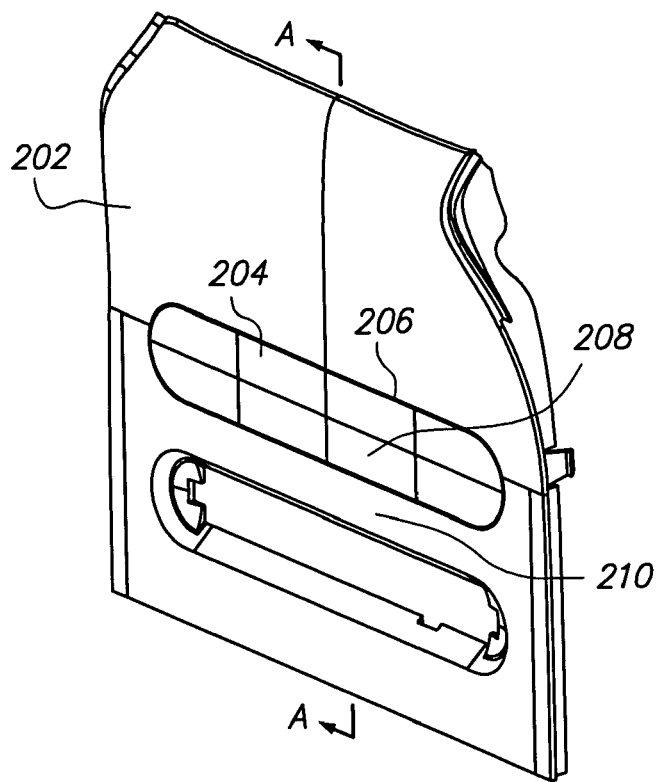
FIG. 2A is a front perspective view of a closed access door of a computer housing according to the present invention.

FIG. 2A shows a front perspective view of a portion of a computer housing 202 with an access door 204 disposed in an opening 205 (FIG. 2B) of housing 202. The gap 206 between the edge of door 204 and housing 206 is so small that it is nearly invisible. In fact, the edges of door 204 directly abut the edges of the opening in housing 202. Further, the front surface 208 of door 204 is flush with the front surface 210 of housing 202 surrounding door 204. The tight gap 206 and the flush surfaces 208 and 210 provide an aesthetically pleasing appearance to housing 202, greatly reduces the amount of dust that can enter housing 202 through the opening, and reduces the risk of accidental damage to door 204.

Figure 2B:
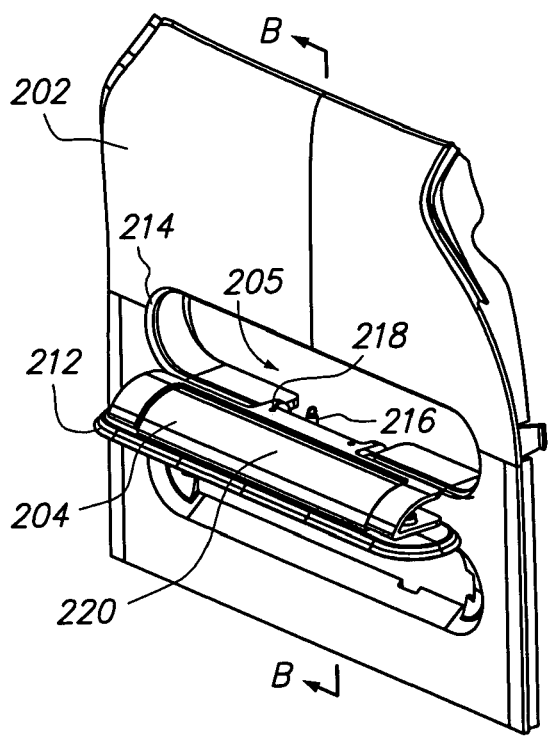
FIG. 2B is a front perspective view of an open access door of a computer housing according to the present invention.

FIG. 2B shows access door 204 in an open position. Door 204 includes a beveled edge 212 that mates with a corresponding beveled seat 214 formed in housing 202 around opening 205. Door 204 is pivotally connected to housing 202 at a position adjacent (in this case below) opening 205, and rotates forward to the open position.

During operation, door 204 is pushed into the open position by a device (e.g., optical disk drive tray) as the device moves out through opening 205 to provide user access. As the device retracts, a spring 216 (optionally 2 springs) pulls door 204 back into the closed position. Spring 216 is shown detached from door 204 in the drawings (so that spring 216 can be clearly seen), but in operation spring 216 engages a connecting aperture 218 formed in the lower rear of door 204.

Note that there are no structures projecting rearward from door 204 which might interfere with a device tray moving in or out of opening 205. The rear surface of door 204 is substantially smooth and includes an arcuate surface that facilitates sliding abutment with a device tray, as the tray pushes door 204 into the open position. Because door 204 swings substantially clear of opening 205, the entirety of opening 205 is available for device travel. Thus, virtually any device that will fit through opening 205 can be used with the door assembly of the present invention.

FIG. 3 is an exploded view of door 204 and housing 202. Door 204 includes a cover 302, a bracket 304, a mounting frame 306, and a hinge pin 308. Cover 302 has a generally flat front surface 208, and is formed to fit within opening 205. Cover 302 mounts elastically to bracket 304. A biasing member 310 of bracket 304 biases cover 302 toward bracket 304, but allows cover 302 to move slightly away from bracket 304 responsive to an external force. Alignment posts (not visible in FIG. 3) on the back of cover 302 fit into alignment apertures 312 in bracket 304 to properly align cover 302 with bracket 304. Bracket 304 includes a pair of L-shaped hinge members 314 that are pivotally mounted to mounting frame 306 via hinge pin 308. Mounting frame 308 is fastened to the inside of housing 202 at opening 205, such that hinge pin 308 is positioned adjacent (below) opening 205, and bracket 304 pivots about hinge pin 308 through opening 205. Mounting frame 306 can be fastened to the inner surface of housing 202 by any convenient means (e.g., clips, screws, rivets, adhesive, etc.).

The elasticity between cover 302 and bracket 304 prevents jamming when door 204 opens and closes. As door 204 begins to open, a force is exerted between the lower edge of beveled seat 214 (FIG. 2B) and the lower beveled edge 212 of door 204. This force overcomes the inward force exerted by biasing member 310, and results in a slight outward travel of cover 302 with respect to bracket 304. The outward travel of cover 302 prevents jamming.

The structure of hinge members 314 also help to prevent jamming between door 204 and seat 214. In particular, hinge members 314 extend in a downward and forward direction, allowing bracket 304 to pivot about an axis below opening 205. Therefore, as bracket 304 pivots from the closed position to the open position, the beveled edge 212 of the bottom side of cover 302 moves outward, away from seat

Figure 1A:
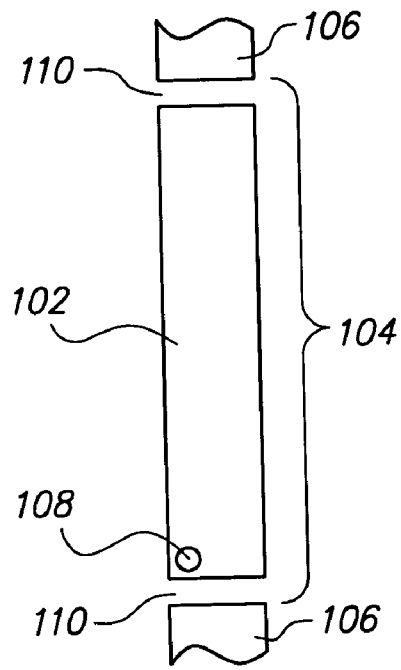
FIG. 1A is a cross-sectional view of a prior art door for an opening in a housing in a closed position.
Figure 1B:
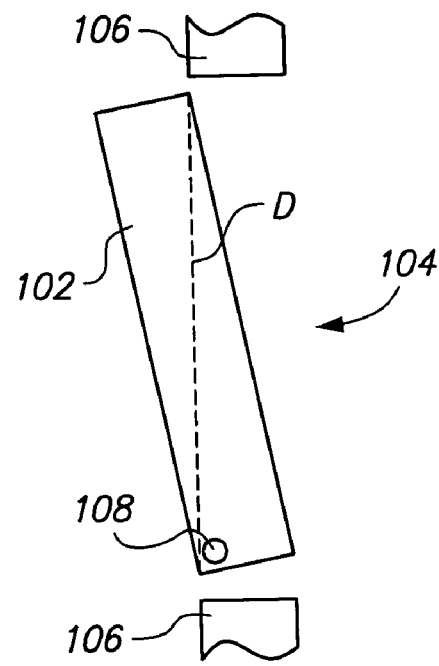
FIG. 1B is a cross-sectional view of a prior art door for an opening in a housing in a slightly open position.
Figure 1C:
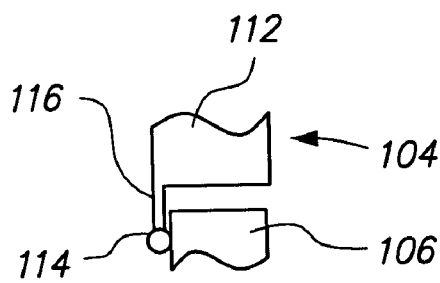
FIG. 1C is a cross-sectional view of a prior art over-sized door for an opening in a housing.
Figure 1D:
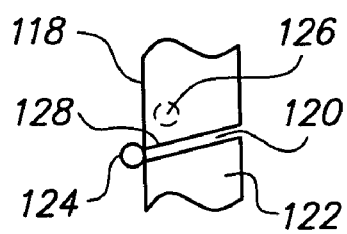
FIG. 1D is a cross-sectional view of a prior art beveled door for an opening in a housing.

214. By comparison, the bottom edge of prior art door 102 shown in FIG. 1B moves inward.

Note also that relative movement between cover 302 and bracket 304 is further facilitated by alignment features that moveable engage one another. In particular, although alignment apertures 312 restrain the lateral movement of the alignment posts of cover 302, the alignment posts are free to move forward and backward within apertures 312.

Figure 4:
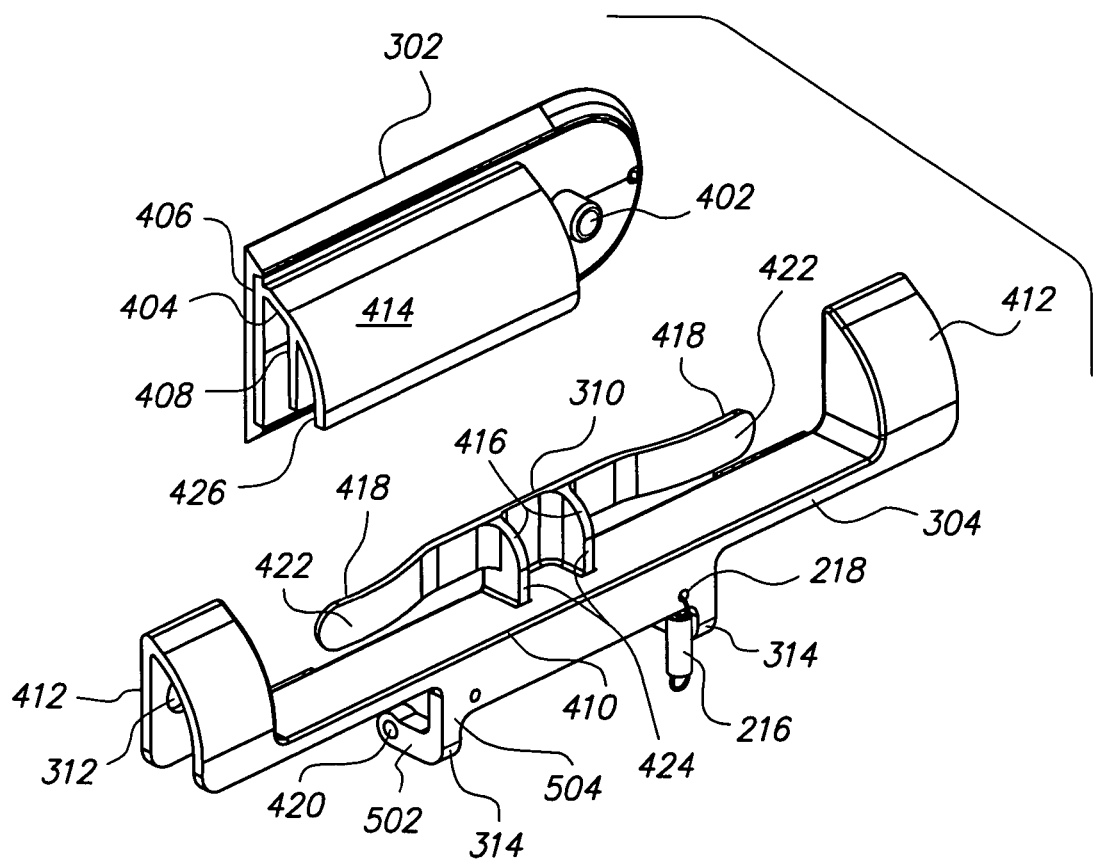
FIG. 4 is a partially cut-away perspective view of the access door of FIG. 3 showing a cover and a bracket of the door detached from one another.

FIG. 4 is a partially cut-away perspective view showing cover 302 and bracket 304 in greater detail. Only one-half of cover 302 is shown in FIG. 4. The half not shown is the same (mirror image) as the half shown. Cover 302 includes a pair (only one shown) of alignment posts 402 that align cover 302 with respect to bracket 304 when inserted in alignment apertures 312 of bracket 304.

Cover 302 also includes a channel 404 mounted to the back of cover 302 between alignment posts 402. Channel 404 includes a front wall 406 and a back wall 408, defining a space therebetween for receiving biasing member 310. A portion (not shown) of rear wall 408 near the center of cover 302 is removed to accommodate the particular structure of biasing member 310.

Bracket 304 includes a main body 410, a pair of risers 412, hinge members 314, and biasing member 310. Risers 412 are disposed at opposite ends of main body 410, and are spaced to accommodate channel 404 therebetween. The rear surface 414 of channel 404 is arcuate in shape, as is the rear surface of each of risers 412. Together, the rear surfaces of channel 404 and risers 412 form the smoothed arcuate rear surface 220 of door 204 (FIG. 2B). Each of risers 412 defines one of alignment apertures 312. Biasing member 310 includes a central support structure 416 fixed to main body 410, and a pair of flat wing springs 418 extending laterally from support structure 416. Hinge members 314 are L-shaped structures that are each fixed to main body 410 at one end, and include a hinge pin receiving aperture 420 for receiving hinge pin 308 (FIG. 3) at the other end.

When cover 302 is mounted to bracket 304, biasing member 310 is disposed in channel 404. Rear surfaces 422 of flat wing springs 418 press against rear wall 408 of channel 404 to urge cover 302 against bracket 304. Biasing member 310 exerts a force sufficient to keep cover 302 mounted to bracket 304, but will allow forward movement of cover 402 to prevent jamming between cover 302 and housing 202. The forward travel of cover 302 with respect to bracket 304 is limited by rear surfaces 424 of support structure 416 abutting a lower inside edge 426 of the rear-most portion of channel 404.

Each of posts 402 is disposed in a corresponding one of apertures 312 to align cover 302 with bracket 304. Apertures 312 restrain the lateral movement of posts 402, but allow post 402 to move freely into and out, of apertures 312. Posts 402 are long enough so that posts 402 will not disengage apertures 312 as biasing member 310 allows forward travel of cover 302 with respect to bracket 304.

In this particular embodiment, bracket 304 is formed of flexible plastic. This facilitates forming wing spring 310 as an integral part of bracket 304, thereby reducing the number of parts that require assembly. Additionally, forming bracket 304 of flexible plastic facilitates mounting cover 302 onto bracket 304. In particular, slightly flexing body 410 of bracket 304 allows alignment posts 402 to clear risers 412 of bracket 304 as wing spring 310 is inserted into channel 404. Then, when bracket 304 is relaxed, posts 402 engage apertures 312 to retain cover 302 on bracket 304.

Although the elastic mount between cover 302 and bracket 304 of the disclosed embodiment employs a flat wing spring disposed in a channel, this particular element (as well as other described elements, even if not explicitly stated) is not an essential element of the present invention. For example, the present invention may be practiced with alternate biasing means, for example by attaching cover 302 to bracket 304 with coil springs, elastic bands, flexible adhesive compounds, etc. As another example, a biasing member can be interposed between cover 302 and bracket 304, and engagement between the two maintained by applying retaining caps to the ends of posts 402 after their insertion through apertures 312. The foregoing examples are provided by way of illustration, and should not be interpreted as limiting the present invention in any way.

FIG. 5A is a cross-sectional view, taken along Line A—A of FIG. 2A, showing door 204 in a closed position. Note the close fit and flush alignment of the front surface of door 204 with the surrounding portion of housing 202. This is a result of a self-aligning feature of the disclosed embodiment. In particular, the elastic mount between cover 302 and bracket 304 allows the beveled edge 212 of cover 302 to settle into proper alignment with beveled seat 214 of opening 205, when door 204 is closed. Cover 302 is then held in proper position by the spring tension of biasing member 310 (not visible in FIG. 5), as bracket 304 is held in the closed position by spring 216.

The self-aligning feature is enhanced by providing additional clearance between the aligning features of cover 302 and bracket 304. In particular, alignment posts 402 are slightly smaller in diameter than alignment apertures 312 (FIG. 4) to allow slight movement of cover 302 in the plane of opening 205. Thus, the complementary aligning features, posts 402 and apertures 312, provide rough alignment between cover 302 and opening 205 (via bracket 304), and fine alignment is provided by the settling of beveled edge 212 in beveled seat 214.

FIG. 5B is a cross-sectional view, taken along Line B—B of FIG. 2B, showing door 204 in an open position. Note that there is sufficient forward (to the left in FIG. 5B) displacement of door 204 such that the lower edge of cover 302 lies just forward of the portion of housing 202 surrounding opening 205. Note also that there is sufficient upward displacement of bracket 304, such that bracket 304 can rotate through opening 205 without requiring any slots or enlargements to facilitate the rotation of a hinge.

The above-described movement of door 204 with respect to opening 205 is provided by L-shaped hinge member 314. In particular, hinge member 314 includes a horizontal (vertical in the open position) portion 502 and a vertical (horizontal in the open position) portion 504 (see also FIG. 4). The length of portion 502 allows bracket 304 to clear the edge of opening 205 as door 204 rotates from the closed to the open position. The length of portion 504 provides the forward displacement necessary for the lower edge of cover 302 to clear housing 202. Additionally, L-shaped hinge member 314 allows bracket 304 to pivot about an axis disposed adjacent opening 205, such that the lower edge of cover 302 moves outward, instead of inward, as door 204 is rotated from the closed to the open position.

Note also that door 204 is substantially free of any structures projecting rearward (upward in the open position) of its rear surface, as are typically found in prior art devices. Instead, the rear surface 220 of door 204 presents a smooth surface overwhich devices can easily slide, and leaves almost the entire cross-sectional area of opening 205 for the passage of devices. The flat portion of the smooth surface is formed by the back side of bracket 304, while the arcuate portion is formed by the back sides of risers 412 and channel 404 (FIG. 4).

The description of particular embodiments of the present invention is now complete. Many of the described features may be substituted, altered or omitted without departing from the scope of the invention. For example, alternate complementary alignment features (e.g., lands and grooves, dimples and depressions, etc.), may be substituted for the alignment post and apertures. As another example, alternate biasing member structures and/or materials may be substituted for the plastic, wing-spring of the disclosed embodiment. These and other deviations from the particular embodiments shown will be apparent to those skilled in the art, particularly in view of the foregoing disclosure.

I claim:

1. An electronic component case comprising:
   a housing for generally enclosing said electronic component, said housing defining an access opening therein;
   a bracket having a first portion and a second portion, said first portion pivotally connected to said housing, whereby said bracket can pivot about an axis; and
   a cover elastically mounted to said second portion of said bracket, said cover is supported by said bracket.

2. The electronic component case of claim 1, wherein:
   said cover includes a back surface; and
   said bracket is elastically coupled to said back surface.

3. The electronic component case of claim 2, further comprising a biasing member disposed to urge said cover against said bracket.

4. The electronic component case of claim 3, wherein said biasing member is integrally formed with said bracket.

5. The electronic component case of claim 3, wherein said biasing member includes a flat spring.

6. The electronic component case of claim 5, wherein said flat spring includes:
   a central support extending upwardly from said bracket; and
   at least one curved wing extending laterally from said central support.

7. The electronic component case of claim 5, wherein said cover further includes a channel disposed to receive said flat spring.

8. The electronic component case of claim 1, wherein:
   said cover includes an alignment feature; and
   said bracket includes a complementary alignment feature, said alignment feature and said complementary alignment feature moveably engaging one another.

9. The electronic component case of claim 8, wherein:
   one of said alignment feature and said complementary alignment feature includes a post;
   the other of said alignment feature and said complementary alignment feature includes a post receiving aperture; and
   said post can move longitudinally along an axis passing through said aperture.

10. The electronic component case of claim 9, wherein:
    one of said alignment feature and said complementary alignment feature includes a plurality of posts; and
    the other of said alignment feature and said complementary alignment feature includes a plurality of post receiving apertures.

11. The electronic component case of claim 10, wherein said bracket includes at least one hinge member extending downwardly and forwardly toward a point of pivotal connection to said housing.

12. The electronic component case of claim 11, wherein said hinge member is L-shaped.

13. The electronic component case of claim 1, wherein said cover includes a beveled edge.

14. The electronic component case of claim 13, wherein:
    said access opening includes a beveled seat;
    said cover includes an alignment feature;
    said bracket includes a complementary alignment feature; and said alignment feature and said complementary alignment feature loosely engage one another to allow said beveled edge of said cover to self-align within said beveled seat of said access opening in said housing.

15. The electronic component case of claim 1, wherein said bracket pivots about an axis adjacent said access opening in said housing.

16. The electronic component case of claim 1, wherein:
    said cover includes a beveled edge; and
    said bracket includes at least one hinge member extending downwardly and forwardly to a pivot axis disposed adjacent said access opening in said housing.

17. The electronic component case of claim 16, further comprising a biasing member disposed to urge said cover against said bracket.

18. The electronic component case of claim 17, wherein:
    said cover includes an alignment feature; and
    said bracket includes a complementary alignment feature, said alignment feature and said complementary alignment feature moveably engaging one another.

19. The electronic component case of claim 18, wherein:
    said biasing member includes a flat spring; and
    said cover includes a channel for receiving said flat spring.

20. The electronic component case of claim 19, wherein:
    said alignment feature includes a post adjacent an end of said channel; and
    said complementary alignment feature includes an aperture adjacent an end of said flat spring.

21. The electronic component case of claim 1, wherein:
    said bracket and said mounted cover form an assembly; and
    said assembly includes a substantially smooth rear surface for slidably abutting devices moving through said access opening in said housing.

22. The electronic component case of claim 21, wherein at least a portion of said smooth rear surface is arcuate.

23. The electronic component case of claim 21, wherein said assembly is substantially free of any member projecting rearward of said smooth rear surface.

24. The electronic component case of claim 1, wherein said cover is sufficiently large to occlude said access opening.

25. The electronic component case of claim 1, wherein said cover is mounted to said bracket such that when said bracket is in a closed position, an edge of said cover will abut an edge of said access opening.

26. The electronic component case of claim 1, wherein the shape of said cover is substantially the same as the shape of said access opening.

27. The electronic component case of claim 1, wherein:
    said bracket is shaped such that said axis will be disposed within said housing; and
    at least a portion of said bracket passes through said access opening when said bracket pivots between a closed and an open position.

28. The electronic component case of claim 1, further comprising:

a second biasing member coupled between said bracket and said housing; and whereby said cover is held in a closed position by said biasing member;

said cover can be urged into an open position by a force exerted on a back surface of said cover; and said second biasing member will restore said cover to said closed position when said force is removed.

29. The electronic component case of claim 1, wherein said electronic component includes a removable media drive, a portion of which moves through said access opening.

30. An electronic component case comprising:
a housing for generally enclosing said electronic component, said housing defining an access opening therein;
a bracket pivotally connected to said housing;
a cover; and
means for elastically mounting said cover to said bracket.

31. The electronic component case of claim 30, further comprising means for biasing said cover against said bracket.

32. The electronic component case of claim 30, further comprising means for loosely aligning said cover with said bracket.

33. The electronic component case of claim 30, further comprising means for pivotally connecting said bracket to said housing.

34. An electronic component case comprising:
a housing for generally enclosing said electronic component, said housing defining an access opening therein;
a bracket adapted to facilitate pivotal engagement with said housing about an axis; and
a cover elastically mounted to said bracket, wherein said axis is spaced apart from said cover.

35. An electronic component comprising:
a housing for generally enclosing said electronic component, said housing defining an access opening therein;
a bracket adapted to facilitate pivotal engagement with said housing; and
a cover elastically mounted to said bracket, wherein said cover is adapted to be coupled to said housing only via said bracket.

36. An electronic component comprising:
a housing for generally enclosing said electronic component, said housing defining an access opening therein;
a bracket pivotally coupled to said housing; and
a cover mounted to said bracket and movable with respect to said bracket to prevent jamming between said cover and said access opening.

* * * * *